United States Patent [19]

Avitan

[11] Patent Number: 5,128,598
[45] Date of Patent: Jul. 7, 1992

[54] MATERIAL HANDLING VEHICLE STEERING SYSTEM

[75] Inventor: Isaac Avitan, Vestal, N.Y.

[73] Assignee: Raymond Corporation, Greene, N.Y.

[21] Appl. No.: 627,106

[22] Filed: Dec. 13, 1990

[51] Int. Cl.⁵ .................. H02P 5/52; B60K 17/30
[52] U.S. Cl. .................. 318/587; 318/139; 318/628; 318/138; 310/112; 310/114; 180/252
[58] Field of Search .............. 318/560-630, 318/138, 139; 364/424.01, 424.02, 424.05; 180/167-169, 6.28, 6.2, 6.44, 6.58, 6.48, 6.5, 6.6, 213, 214, 252, 264, 65.5, 79.1, 148, 149, 907; 901/1, 2, 3

[56] References Cited

U.S. PATENT DOCUMENTS

| | | | |
|---|---|---|---|
| 3,749,949 | 7/1973 | Muller | 310/114 X |
| 3,898,490 | 8/1975 | Wedman | 310/114 X |
| 3,944,865 | 3/1976 | Jewitt | 310/114 X |
| 3,973,137 | 8/1976 | Drobina | 310/114 X |
| 4,329,606 | 5/1982 | Montagu | 310/112 X |
| 4,373,147 | 2/1983 | Carlson, Jr. | 310/114 X |
| 4,375,047 | 2/1983 | Nelson et al. | 310/114 X |
| 4,504,753 | 3/1985 | Koch | 310/114 X |
| 4,511,825 | 4/1985 | Klimo | 318/628 X |
| 4,513,839 | 4/1985 | Nieminski et al. | 180/253 |
| 4,519,466 | 5/1985 | Shiraishi | 180/252 X |
| 4,573,548 | 3/1986 | Holland | 180/252 X |
| 4,683,973 | 8/1987 | Honjo et al. | 180/252 |
| 4,749,898 | 6/1988 | Suzuki et al. | 310/114 |
| 4,772,875 | 9/1988 | Maddox et al. | 901/1 X |
| 4,855,655 | 8/1989 | Shimizu | 318/628 X |
| 4,895,216 | 1/1990 | Fusimi et al. | 364/424.05 |
| 4,939,653 | 7/1990 | Tsurumiya et al. | 364/424.05 |
| 4,943,758 | 7/1990 | Tsurumiya | 318/504 |
| 4,959,595 | 9/1990 | Nishimura | 318/138 |

*Primary Examiner*—Paul Ip
*Attorney, Agent, or Firm*—Salzman & Levy

[57] ABSTRACT

A unique steer/drive control system is featured for steering a material handling vehicle by the use of directly coupled traction and steering motors. The steering motor is fabricated as a hollow shaft dc motor, whose inner ring represents the rotor, and whose outer ring represents the stator. The stator is connected to a frame of the vehicle carrying the steering and drive wheel. The rotor is integrally connected to the traction motor that drives the steering and drive wheel. A hand operated steering mechanism rotationally guides the vehicle. A steering angle sensor determines the difference between actual and desired heading of the steering and drive wheel. The steer/drive system utilizes the sensed difference, and generates a signal for controlling the heading of the steering and drive wheel.

24 Claims, 3 Drawing Sheets

MATERIAL HANDLING VEHICLE STEERING SYSTEM

FIELD OF THE INVENTION

The invention pertains to control systems for material handling vehicles, and more particularly to a directly coupled, integral steering and drive mechanism for controlling the direction and speed of a steering and drive wheel of a forklift truck.

BACKGROUND OF THE INVENTION

The present invention relates to forklift vehicles having an integral steering and drive mechanism.

In the past, steering material handling forklift trucks was accomplished by utilizing a single steer/drive unit. That is, the vehicle had a single wheel used for both driving and steering. The steering angle of the wheel was controlled through an offset steer motor coupled to the drive unit through a gear reducer, a pinion gear directly coupled or coupled through a connecting chain. The steer motor was usually an electric motor or a hydraulic motor.

Where an electric motor drive was used, a control circuit was employed to determine the direction of motor rotation and for varying the applied voltage(s).

Where a hydraulic motor was implemented, an electric motor was used to drive a hydraulic pump that supplied fluid to the hydraulic motor. In the case of manually controlled hydraulic systems, manually operated rotary valves were used for determining the direction of hydraulic motor rotation and for varying the rate of hydraulic fluid flow. In the case of electro-hydraulic systems, an electric signaling device was used in conjunction with a servo or proportioning valve for determining the direction of hydraulic motor rotation and for varying the rate of hydraulic fluid flow.

Generally, both of the aforementioned systems also required a steer motor speed sensor connected to the shaft of the steer motor, and a steering angle sensor connected to the drive unit, in order to complete the circuit loop in the control system.

The primary purpose of the speed motor sensor was to prevent harmonic oscillation due to the mechanical coupling backlash in the gear reducer, pinion gear directly coupled or coupled through the drive chain between the steering motor and the drive unit.

The present invention seeks to integrate the traction motor and steering motor into a single steer/drive system in order to eliminate the need for a gear reducer and pinion gear directly coupled or coupled through a drive chain between the two motors. This in turn eliminates the need for a separate speed motor sensor.

The present invention not only eliminates many parts in the traditional steer drive arrangement, but it also has the advantage of eliminating the troublesome harmonic oscillations inherent within the conventional steer system. Direct motor coupling makes such oscillations impossible.

DISCUSSION OF RELATED ART

In U.S. Pat. No. 4,873,475, issued to Togo et al on Oct. 10, 1989, for "Electrically Powered Power Steering System For Industrial Vehicle Or The Like," a power-assisted steering control system for material handling vehicles is disclosed that eliminates kickback through the steering wheel.

In U.S. Pat. No. 4,940,102 issued to Morishita on Jul. 10, 1990 for "Motor-Driven Power Steering System," a control system is described that adjusts the steering force necessary to steer the vehicle at varying vehicular speed.

A power-assisted steering control system is similarly shown in U.S. Pat. No. 2,754,465 issued to Brier on Jul. 10, 1956, for "Electric Motor Control For Power Steering."

The aforementioned patents teach power steering control systems. Such systems do not feature the directly coupled steering and drive motors of the present invention, nor do they suggest the objectives sought to be accomplished by the current system.

In U.S. Pat. No. 3,768,586 issued to Thompson et al for "Vehicle Guidance System," a conventional means is disclosed for steering, using electro-mechanical principles, for use with automated guidance vehicles.

SUMMARY OF THE INVENTION

In accordance with the present invention, there is provided a unique control system for steering a material handling vehicle by the use of directly coupled traction and steering motors referred to as the steer/drive system. The steering motor is fabricated as a hollow shaft dc motor, whose inner ring represents the rotor, and whose outer ring represents the stator. The stator is connected to a frame of the vehicle carrying the steering and drive wheel. The rotor is integrally connected to the traction motor that drives the steer/drive system.

It is an object of the present invention to provide an improved single steer/drive system for material handling vehicles.

It is another object of this invention to eliminate the gear reducer, pinion gear and chain drive mechanism for coupling the steering motor with the traction motor assembly of a material handling vehicle utilizing a single steer/drive system.

It is a further object of the invention to provide an integrally coupled steering and traction motor for the control of a single, steering and drive wheel of a material handling vehicle.

It is still another object of this invention to eliminate harmonic oscillations in the steering control of a material handling vehicle.

BRIEF DESCRIPTION OF THE DRAWINGS

A complete understanding of the present invention and its objectives may be obtained by reference to the subsequently presented detailed description considered in conjunction with the accompanying drawings, in which.

DESCRIPTION OF THE PREFERRED EMBODIMENT

Generally speaking, the present invention features a new directly coupled steering and drive motor system for the control of a single steering and drive wheel of a material handling vehicle. The steering motor of the system is fabricated as a hollow shaft, dc motor whose stator is connected to the frame of the vehicle that supports the steering and drive wheel. A traction motor is mounted within the steering motor, and is directly coupled to its armature or rotor. The integrally coupled motors eliminate the need for conventional drive chain elements, which in turn eliminates the annoying harmonic oscillations introduced by the chain drive.

For the purposes of brevity, like elements will bear the same designations throughout the figures.

Figure 1:
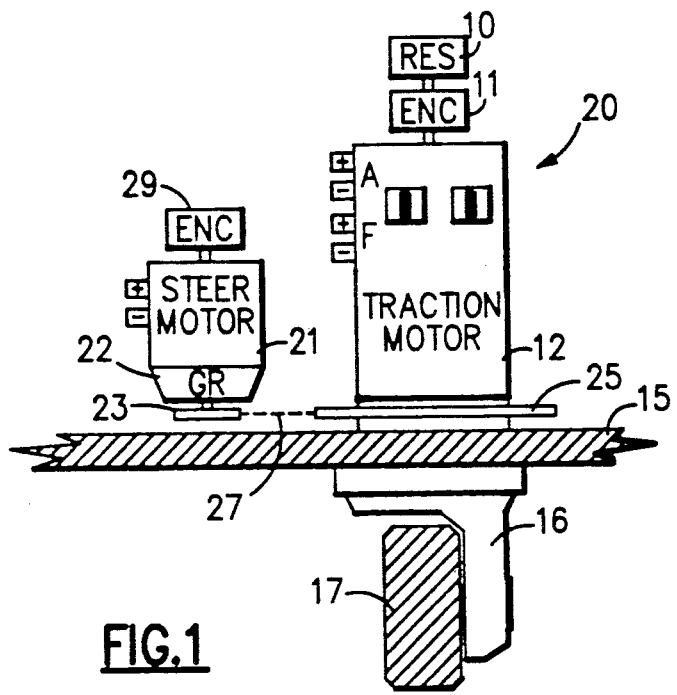
FIG. 1 is a schematic view, shown in sectional crosscut, of a prior art gear reducer, pinion gear, chain driven, steering and drive motor system for a material handling vehicle.

Now referring to FIG. 1, a prior art, conventional lift truck steering and drive system 20 is shown. The steering and drive system 20 features a spaced-apart steer motor 21 and traction motor 12.

The material handling truck has a single, combination steering and drive wheel 17 that is driven by the traction motor 12 via an internal drive shaft (not shown). The internal drive shaft engages the steering and drive unit 16. The steering and drive unit 16 comprises a transmission that adapts the speed of the wheel to that of the traction motor 12. The traction motor 12 and steering and drive unit 16 are attached and integrally mounted on the material handling truck frame 15.

A pinion gear 23 driven by the steer motor 21 through a gear reducer 22 drives a master gear 25 attached to the traction motor 12 via a drive chain 27. A speed sensor 29 is mounted upon the steer motor 21, which can be either an electric or a hydraulic motor. Speed sensor 29 detects the speed of steer motor 21.

A steer angle sensor 10 and a speed sensor 11 are mounted upon the traction motor 12, as shown. Speed sensor 11 detects the speed of traction motor 12 on which it is mounted, while steer angle sensor 10 detects drive unit position in conjunction with steer motor 21.

Figure 2:
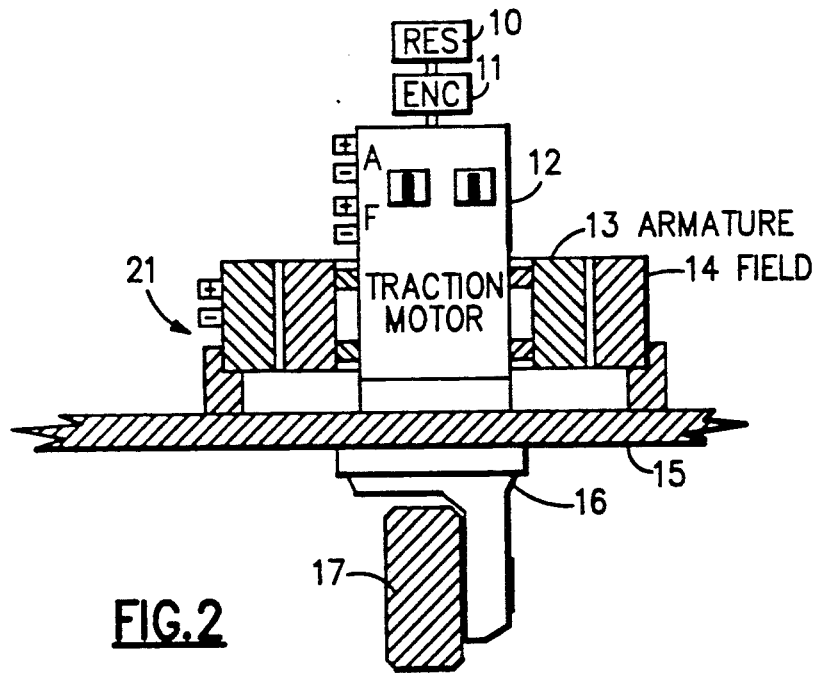
FIG. 2 is a schematic view, shown in sectional crosscut, of the integrally coupled steering and drive motor system for a material handling vehicle of this invention.

Referring now to the invention illustrated in FIG. 2, the traction motor 12 has been combined with the steer motor 21. The steer motor 21 as constructed in the invention is a hollow shaft dc motor, whose outer stator 14 is attached to the frame 15, and whose inner rotor 13 is attached to the traction motor 12. A typical motor may be purchased from the Inland Motor Specialty Products Company, having the Model No. QT-11303.

The invention shown in FIG. 2 allows for the steer motor 21 to directly couple with, and rotationally drive the traction motor 12. This eliminates the prior art pinion gear 23, the gear reducer 22, the master gear 25 and the drive chain 27, as well as the speed sensor 29, which is now incorporated into the steer angle sensor 10 of the traction motor 12. The function of the steer motor speed sensor 29 (FIG. 1) has now been incorporated in steer angle sensor 10 of the invention.

With the elimination of the drive chain, gear reducer and pinion gear components, the new system eliminates the problem of harmonic oscillation attendant with drive chain backlash.

The stator or field of the steer motor 21 features an outer ring magnet of rare earth materials. The inner armature or rotor of the steer motor is also fashioned as a ring member, and is operatively connected to the angular rotational elements of the steer and drive unit 16. It should be understood that a shunt wound motor could serve the same purpose and therefore the invention is not intended to be limited to the example described herein.

Figure 3:
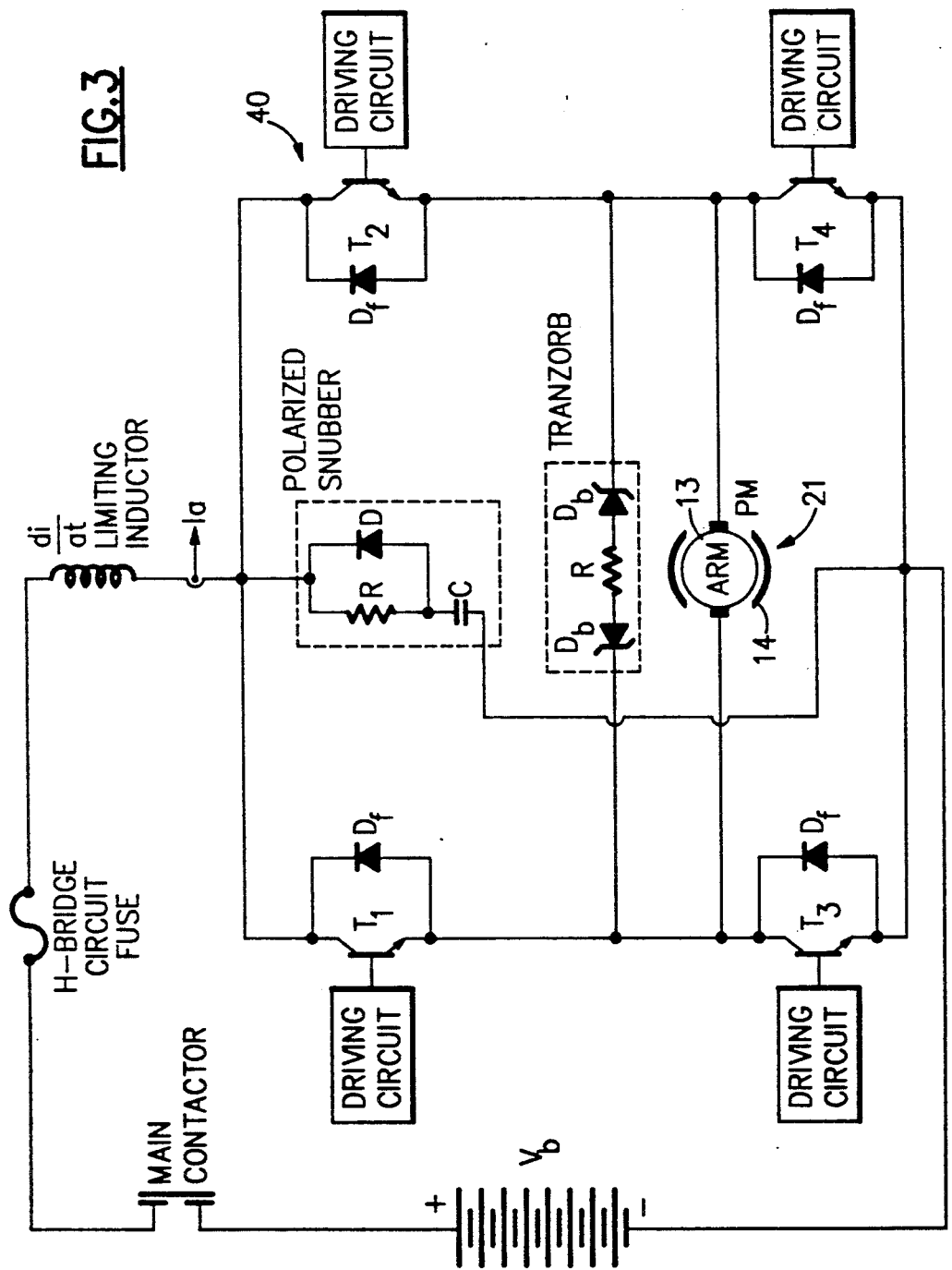
FIG. 3 is a diagram of the power control circuit for the integrally coupled steering and drive motor system of this invention, illustrated in FIG. 2.

Referring now also to FIG. 3, the power control circuit includes a transistorized, H-bridge armature voltage amplifier circuit 40 connected across the armature 13 of the steering motor 21. The H-bridge armature voltage amplifier circuit 40 determines the direction of dc motor rotation, and applied voltage to the armature.

Figure 4:
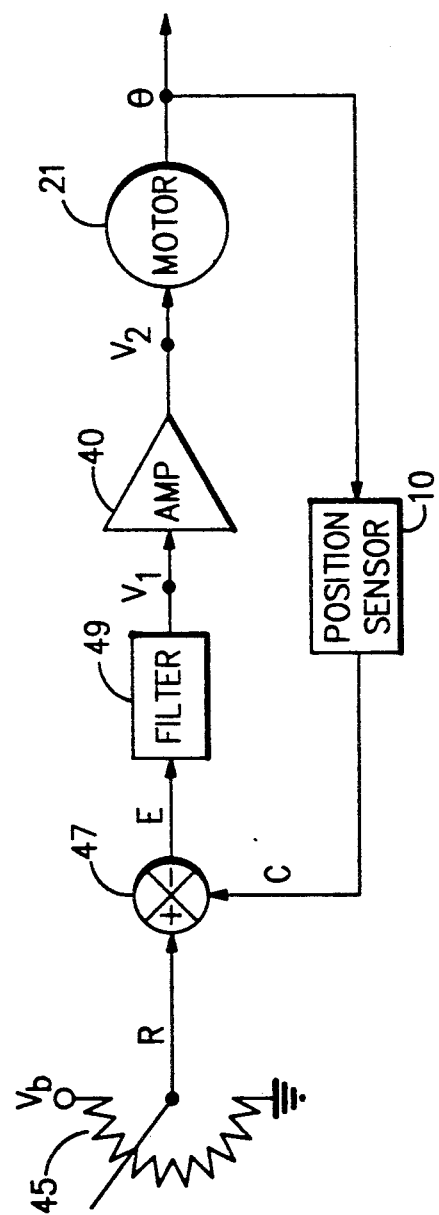
FIG. 4 is a control block diagram of a feedback control circuit for the integrally coupled steering and drive motor system of the invention, depicted in FIG. 2.

Referring to FIG. 4, a feedback system for controlling the steering of the invention is illustrated. The steering wheel 45 is merely a rheostat for providing a variable voltage signal to the system. Connected to steering wheel 45 by means of an angle position reference signal R is a summing device 47. Also connected to summing device 47 is an angle position feedback signal C, described in greater detail herein below.

Summing device 47 generates an angle position error signal E, representing the difference between angle position reference signal R and angle position feedback signal C. In other words, $E = R - C$.

Angle position error signal E is applied to a filter 49, which generates a filter output voltage $V_1$, which is applied to the H-bridge armature voltage amplifier 40. Amplifier 40 then generates an amplifier output voltage $V_2$, which is applied to the armature 13 (FIG. 2) of motor 21.

The resulting displacement of motor 21, shown as motor position $\Theta$, is then applied to position sensor 10. Position sensor 10 then generates aforementioned angle position feedback signal C, which is applied to summing device 47. Accordingly, the desired steering position, as generated by steering wheel 45, is compared to the feedback actual motor drive position, resulting in the position error signal.

Having thus described the current invention, what is desired to be protected by Letters Patent is presented by the subsequently appended claims.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A direct drive steering system having an angle position reference signal providing means for material handling vehicles comprising:
   a) a steering motor of an integrally combined steering motor and traction motor unit, said steering motor having a stator and a rotor;
   b) a traction motor of said integrally combined steering motor and traction motor unit, said traction motor being disposed within said steering motor and directly coupled to said rotor thereof;
   c) a drive wheel;
   d) a frame supporting said steering and drive wheel, and said stator of said steering motor;
   e) an angle position reference signal providing means for providing an angle position reference signal;
   f) angle position feedback means connected to said traction motor for providing a signal representative of actual angle position of said steering and drive wheel; and
   g) a controller operatively combined with said integrally combined steering motor and traction motor unit, and operatively connected to said angle position feedback means, and to said angle position reference signal providing means for comparing said angle position feedback signal to said angle position reference signal and for generating a signal in response thereto for controlling direction and angular displacement of said steering and drive wheel for controlling angular position thereof.

2. An integrally coupled drive and steering mechanism for material handling vehicles which is directly coupled to a steering an drive wheel of the material handling vehicle for directly controlling same, comprising:
 a) a hollow shaft dc steering motor having an outer, stator portion and an inner, rotor portion;
 b) a steering and drive wheel;
 c) a frame of a material handling vehicle directly connected to said outer, stator portion of said hollow shaft dc motor, and supportive of said steering and drive wheel of said material handling vehicle; and
 d) traction means directly coupled to said inner, rotor portion of said hollow shaft dc steering motor and directly coupled to said steering and drive wheel of said material handling vehicle, for driving said steering and drive wheel.

3. The integrally coupled drive and steering mechanism for material handling vehicles in accordance with claim 2, wherein said inner and outer portions of said hollow shaft dc motor respectively comprise a ring section.

4. The integrally coupled drive and steering mechanism for material handling vehicles in accordance with claim 2, wherein said traction means includes a traction motor.

5. The integrally coupled drive and steering mechanism for material handling vehicles in accordance with claim 2, further comprising:
 d) an angle position sensor operatively connected to said steering and drive wheel for determining heading or steering angle of said steering and drive wheel.

6. The integrally coupled drive and steering mechanism for material handling vehicles in accordance with claim 5, further comprising:
 e) an armature current sensor operatively connected to said inner, rotor portion of said hollow shaft dc motor for determining armature current of said hollow shaft dc motor.

7. The integrally coupled drive and steering mechanism for material handling vehicles in accordance with claim 5, wherein said angle position sensor additionally determines motor speed of said hollow shaft dc motor.

8. The integrally coupled drive and steering mechanism for material handling vehicles in accordance with claim 2, further comprising:
 d) an armature current sensor operatively connected to said inner, rotor portion of said hollow shaft dc motor for determining armature current of said hollow shaft dc motor.

9. The integrally coupled drive and steering mechanism for material handling vehicles in accordance with claim 2, further comprising:
 d) an armature voltage amplifier operatively connected to said inner, rotor portion of said hollow shaft dc motor for varying applied armature voltage and for determining rotational direction and angular displacement of said hollow shaft dc motor.

10. The integrally coupled drive and steering mechanism for material handling vehicles in accordance with claim 9, wherein said armature voltage amplifier comprises a transistorized H-bridge circuit.

11. The integrally coupled drive and steering mechanism for material handling vehicles in accordance with claim 5, further comprising:
 e) an armature voltage amplifier operatively connected to said inner, rotor portion of said hollow shaft dc motor for varying applied armature voltage and for determining rotational direction and angular displacement of said hollow shaft dc motor.

12. The integrally coupled drive and steering mechanism for material handling vehicles in accordance with claim 5, further comprising:
 e) a hand operated steering mechanism operatively connected to said steering and drive wheel for rotationally guiding said steering and drive wheel; and
 f) control means operatively connected to said hand operated steering mechanism and to said angle position sensor for determining a difference between actual and desired angle of said steering and drive wheel, said control means generating a signal for controlling the heading of said steering and drive wheel.

13. The integrally coupled drive and steering mechanism for material handling vehicles in accordance with claim 11, further comprising:
 f) a hand operated steering mechanism operatively connected to said steering and drive wheel for rotationally guiding said steering and drive wheel.

14. A drive and steering mechanism for material handling vehicles which is directly coupled to a steering and drive wheel of the material handling vehicle for directly controlling same, comprising:
 a) a steering motor having a stator portion and a rotor portion;
 b) a steering and drive wheel of said material handling vehicle directly coupled to said rotor portion of said steering motor and directly steered thereby; and
 c) traction means directly coupled to said rotor portion of said steering motor and connected to said steering and drive wheel of said material handling vehicle, for driving said steering and drive wheel.

15. The drive and steering mechanism for material handling vehicles in accordance with claim 14, wherein said traction means includes a traction motor.

16. The drive and steering mechanism for material handling vehicles in accordance with claim 14, further comprising:
 d) an angle position sensor operatively connected to said steering and drive wheel for determining heading or steering angle thereof.

17. The drive and steering mechanism for material handling vehicles in accordance with claim 16, further comprising:
 e) an armature current sensor operatively connected to said rotor portion of said steering motor for determining armature current of said steering motor.

18. The drive and steering mechanism for material handling vehicles in accordance with claim 17, wherein said angle position sensor additionally determines motor speed of said steering motor.

19. The drive and steering mechanism for material handling vehicles in accordance with claim 14, further comprising:
   d) an armature current sensor operatively connected to said rotor portion of said steering motor for determining armature current of said steering motor.

20. The drive and steering mechanism for material handling vehicles in accordance with claim 14, further comprising:
   d) an armature voltage amplifier operatively connected to said rotor portion of said steering motor for varying applied armature voltage and for determining rotational direction and angular displacement of said steering motor.

21. The drive and steering mechanism for material handling vehicles in accordance with claim 20, wherein said armature voltage amplifier comprises a transistorized H-bridge circuit.

22. The drive and steering mechanism for material handling vehicles in accordance with claim 16, further comprising:
   e) an armature voltage amplifier operatively connected to said rotor portion of said steering motor for varying applied armature voltage and for determining rotational direction of said steering motor.

23. The drive and steering mechanism for material handling vehicles in accordance with claim 16, further comprising:
   e) a hand operated steering mechanism operatively connected to said steering and drive wheel for rotationally guiding said steering and drive wheel; and
   f) control means operatively connected to said hand operated steering mechanism and to said angle position sensor for determining a difference between actual and desired angle of said steering and drive wheel, said control means generating a signal for controlling the heading of said steering and drive wheel.

24. The drive and steering mechanism for material handling vehicles in accordance with claim 22, further comprising:
   f) a hand operated steering mechanism operatively connected to said steering and drive wheel for rotationally guiding said steering and drive wheel.

* * * * *